US011255757B2

(12) United States Patent
Limbeck et al.

(10) Patent No.: US 11,255,757 B2
(45) Date of Patent: Feb. 22, 2022

(54) APPARATUS AND METHOD FOR ANALYSING A SOLID SPECIMEN MATERIAL

(71) Applicant: TECHNISCHE UNIVERSITÄT WIEN, Vienna (AT)

(72) Inventors: Andreas Limbeck, Vienna (AT); Maximilian Bonta, Vienna (AT); Johannes Frank, Klosterneuburg (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 305 days.

(21) Appl. No.: 16/339,686

(22) PCT Filed: Oct. 5, 2017

(86) PCT No.: PCT/AT2017/060251
§ 371 (c)(1),
(2) Date: Apr. 4, 2019

(87) PCT Pub. No.: WO2018/064695
PCT Pub. Date: Apr. 12, 2018

(65) Prior Publication Data
US 2020/0049597 A1   Feb. 13, 2020

(30) Foreign Application Priority Data

Oct. 5, 2016   (AT) .............................. A 50900/2016

(51) Int. Cl.
*G01N 1/04*   (2006.01)
*G01N 1/10*   (2006.01)
(Continued)

(52) U.S. Cl.
CPC ................ *G01N 1/04* (2013.01); *G01N 1/10* (2013.01); *G01N 21/17* (2013.01);
(Continued)

(58) Field of Classification Search
CPC ....... G01N 2001/045; G01N 2001/383; G01N 2001/1006; H01J 49/0459
See application file for complete search history.

(56) References Cited

U.S. PATENT DOCUMENTS 3,186,232 A * 6/1965 Buhl ........................ G01N 1/10
                                                   73/863.85
5,526,110 A * 6/1996 Braymen ............... G01N 21/73
                                                    250/252.1
(Continued)

FOREIGN PATENT DOCUMENTS

DE        10320552 A1   11/2004
DE    102006056929 A1    6/2008
(Continued)

OTHER PUBLICATIONS

Douglas, D. et al., "Laser Ablation of a Sample In Liquid—LASIL," Journal of Analytical Atomic Spectrometry, vol. 26, No. 6, Jun. 2011, Published Online Jan. 19, 2011, 8 pages.
(Continued)

*Primary Examiner* — Daniel S Larkin
(74) *Attorney, Agent, or Firm* — McCoy Russell LLP

(57) ABSTRACT

An apparatus and a method for analysing a solid specimen material by means of ablating particles of the solid specimen material by laser into a carrier liquid, having: a specimen holder for arranging the solid specimen material covered by the carrier liquid, a laser apparatus for irradiating the solid specimen material to produce a suspension of particles of the solid specimen material and the carrier liquid, an analysis apparatus for analysing the particles, an ablation cell with the specimen holder, having a liquid channel for the carrier liquid and having an entry window made of a material that transmits the laser beam, a supply line for supplying the carrier liquid into the liquid channel of the ablation cell and a discharge line for discharging the suspension of particles
(Continued)

of the solid specimen material and the carrier liquid from the liquid channel of the ablation cell into the analysis apparatus.

12 Claims, 4 Drawing Sheets

(51) Int. Cl.
*G01N 21/17* (2006.01)
*H01J 49/04* (2006.01)

(52) U.S. Cl.
CPC .... *H01J 49/0459* (2013.01); *G01N 2001/045* (2013.01); *G01N 2001/1006* (2013.01)

(56) References Cited

U.S. PATENT DOCUMENTS

| 9,524,856 | B2* | 12/2016 | Hilliard | G01N 1/2226 |
| 2011/0186511 | A1 | 8/2011 | Sakai et al. | |
| 2012/0079894 | A1 | 4/2012 | Van Berkel et al. | |
| 2016/0320269 | A1* | 11/2016 | Hilliard | G01N 1/04 |
| 2016/0334377 | A1* | 11/2016 | Wachinger | G01N 1/04 |

FOREIGN PATENT DOCUMENTS

| EP | 2626195 A1 | 8/2013 |
| WO | 2010087869 A1 | 8/2010 |
| WO | 2014113293 A1 | 7/2014 |
| WO | 2014127034 A1 | 8/2014 |
| WO | 2014178935 A1 | 11/2014 |
| WO | 2016042165 A1 | 3/2016 |
| WO | 2016079681 A1 | 5/2016 |

OTHER PUBLICATIONS

ISA European Patent Office, International Search Repod Issued in Application No. PCT/AT2017/060251, dated Dec. 20, 2017, WIPO, 4 pages.

* cited by examiner

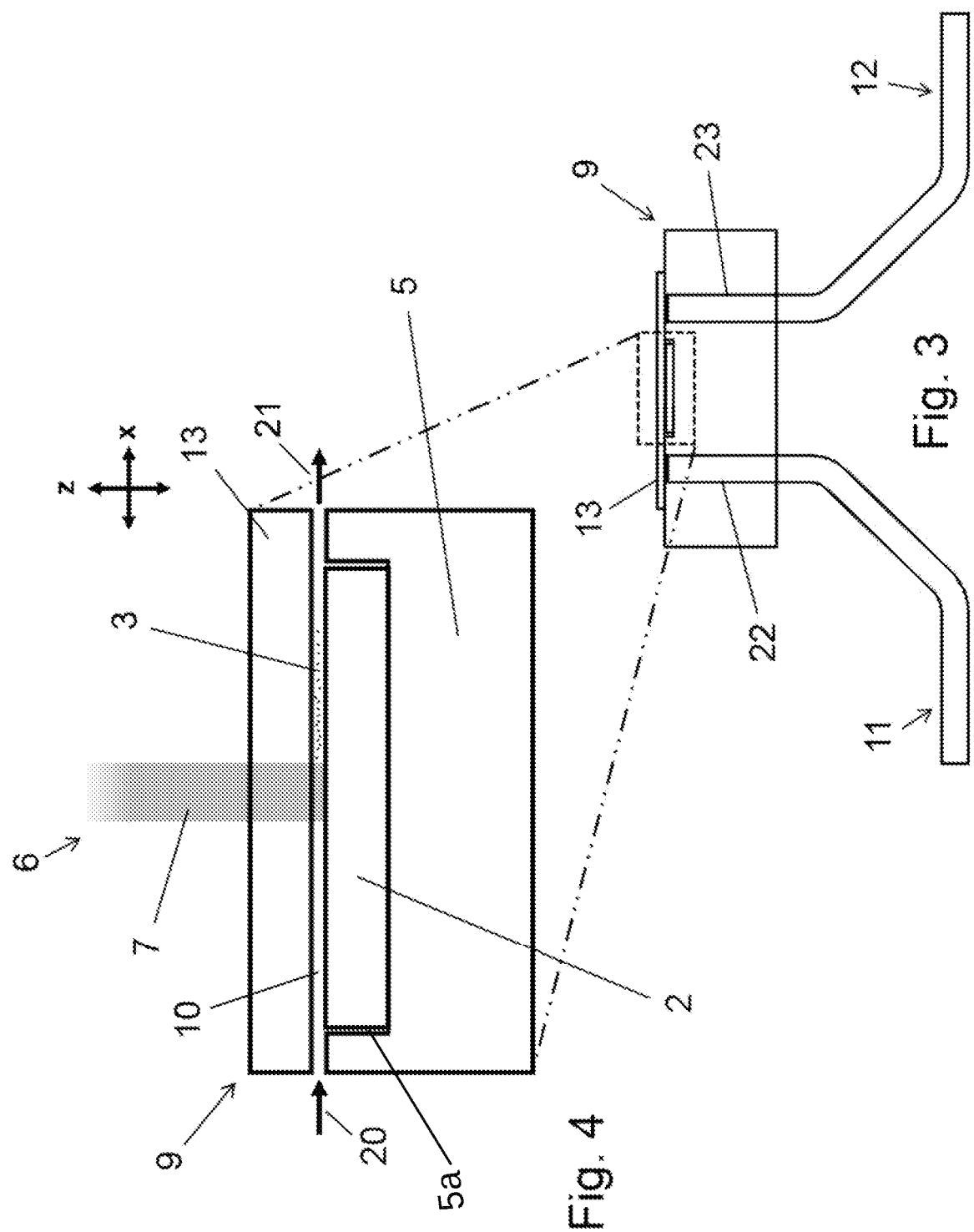

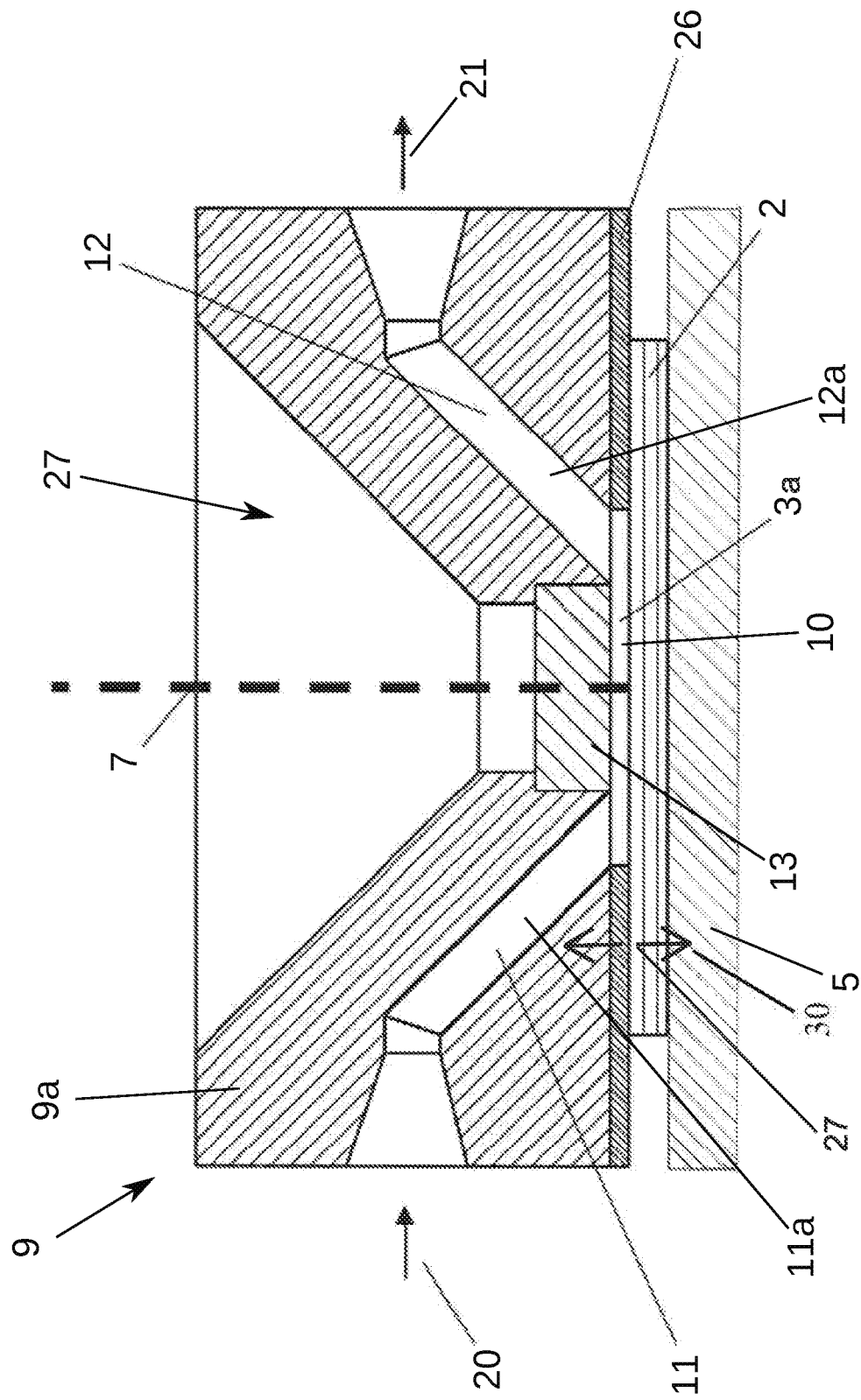

APPARATUS AND METHOD FOR ANALYSING A SOLID SPECIMEN MATERIAL

CROSS-REFERENCE TO RELATED APPLICATIONS

The present application is a U.S. National Phase of International Patent Application Serial No. PCT/AT2017/060251 entitled "APPARATUS AND METHOD FOR ANALYSING A SOLID SPECIMEN MATERIAL," filed on Oct. 5, 2017. International Patent Application Serial No. PCT/AT2017/060251 claims priority to Austrian Patent Application No. A50900/2016, filed on Oct. 5, 2016. The entire contents of each of the above-cited applications are hereby incorporated by reference for all purposes.

TECHNICAL FIELD

The invention relates to a device for analysing a solid sample (specimen) material by means of laser ablation of particles of the solid sample material in a carrier liquid.

BACKGROUND AND SUMMARY

In order to be able to determine the elemental composition of solid samples with high precision, in the prior art, it is known to dissolve the solid sample using acid digestion or fusion. The sample solution can subsequently be analysed using a method for elemental analysis (for example flame or electrothermal atomic absorption spectroscopy, ICP-OES, ICP-MS). This method is suitable for those materials which dissolve readily in acids, for example metals and their alloys. However, if the sample is chemically inert or barely dissolves or is insoluble in acids, labour-intensive methods such as microwave disintegration or high pressure incineration in combination with suitable reagents (for example with an oxidizing agent) have to be used in order to provide the sample in a dissolved form. This property is particularly pertinent as regards ceramic materials which, however, are of particularly importance, in particular when manufacturing modern functional substances.

In order to overcome the difficulties associated with the transfer of solids into solutions, direct solid state analytical methods may be relied upon as an alternative. Many methods are available in this regard such as, for example, X-ray fluorescence, scanning electron microscopic analysis, spark spectrometry and laser ablation-ICP-MS ("inductively coupled plasma mass spectrometry"). Substantial disadvantages with X-ray-based methods are the limitations encountered in the analysis of light elements; in the case of ablation methods, they are the dependency of the signal production on the matrix and the concomitant necessity for standards which are tailored to the matrices. Such standards are not available for all categories of substances, particularly when the materials are newly developed. In addition, the accuracy of the determination for most solid state analytical methods is not sufficient to be able to determine the stoichiometry of new materials with sufficient precision.

A combination of solid and liquid analysis is offered by LASIL ("Laser Ablation of a Solid in Liquid"). In this regard, the solid sample is in a liquid through which a focussed and pulsed laser beam is fired. The laser beam impinges upon the sample surface, whereupon nanoparticles of the sample are dispersed into the liquid. In this manner, what is known as a nanosol is formed.

LASIL technology is used on the one hand for the production of nanoparticles. An application of this type has been described, for example, in WO 2010/087869 A1. In this respect, a solid sample in a container is covered with a layer of liquid several millimetres deep. The sample is irradiated with a laser beam in order to produce metallic nanoparticles. A stream of liquid is passed through the container, so that the nanoparticles can be entrained and collected. However, this configuration is unsuitable for a chemical analysis.

Furthermore, LASIL occasionally has already been used for chemical analysis. In this regard, until now a stationary droplet has been applied to the sample surface before passing a laser beam through the stationary droplet. After manually removing the liquid using a pipette, the sample nanosol produced was then analysed using conventional ICP-MS for the analysis of liquids. This method has been explained, for example, by Douglas et al, in "Laser Ablation of a Sample in Liquid—LASIL", J. Anal. At. Spectrom., 2011, 26, 1294.

A major advantage of LASIL is that no standards which are tailored to the matrix are necessary and aqueous standard solutions can be used to quantify the signal intensities obtained. However, in previous experimental setups, the manual step of transferring the sample into the measuring instrument constitutes a major limitation. Other disadvantages of the known methods are the possibility of contamination and the sedimentation of the particles generated during transfer of the suspension to the measuring instrument.

Analytical techniques of different types are known from US 2012/0079894 A1, DE 10 2006 056 929 A1 and WO 2014/127034 A1.

The objective of the invention is to alleviate or remove at least individual disadvantages of the prior art. Thus, the aim of the invention is to improve the known "LASIL" devices or methods such as to allow a simpler and more precise analysis of the solid sample material to be carried out.

This objective is achieved by means of a LASIL device having a sample holder for positioning a solid sample material covered in a carrier liquid, a laser device for irradiating the solid sample material with a laser beam in a manner such that a suspension of particles of the solid sample material and the carrier liquid can be produced, and an analytical device for analyzing the particles of the solid sample material. The sample holder may be within an ablation cell which has a liquid channel for the carrier liquid and a transparent entry window. The housing of the ablation cell may additionally include a supply line to supply the carrier liquid to the liquid channel and a discharge line to discharge the suspension particles of the solid sample material and the carrier liquid from the liquid channel of the ablation cell to an analytical device.

The LASIL device in accordance with the invention is characterized by:
- an ablation cell having the sample holder for the solid sample material, having a liquid channel for the carrier liquid and having an entry window produced from a material that is transparent to the laser beam of the laser device;
- a supply line to supply the carrier liquid to the liquid channel of the ablation cell; and
- a discharge line to discharge the suspension of particles of the solid sample material and of the carrier liquid from the liquid channel of the ablation cell to the analytical device.

In accordance with the invention, one side of the liquid channel of the ablation cell is connected to the supply line and the other side is connected to the discharge line for the carrier liquid. In this manner, the ablation cell is configured as a flow-through cell through which the carrier liquid can flow continuously. The supply line and the discharge line can respectively be formed as a tube or pipe. The carrier liquid is conveyed into the liquid channel of the ablation cell via the supply line and after passing through the liquid channel, it is conveyed to the analytical device via the discharge line. Preferably, the discharge line is connected directly to the input for the analytical device. In addition, the ablation or washout cell comprises a laser beam entry window which is produced from a material that is transparent to the laser beam of the laser device. The laser beam is coupled into the ablation cell via the entry window, whereupon the laser beam penetrates into the carrier liquid coming into the liquid channel from the supply line and impinges on the surface of the solid sample material. In this manner, particles, in particular nanoparticles, are released from the surface of the solid sample material, so that a suspension of particles of solid sample material and of the carrier liquid, in particular in the form of a nanosol, is produced. Next, the suspension is conveyed via the discharge line to the analytical device in which, in particular, the chemical composition of the solid sample material is determined. The embodiment in accordance with the invention on the one hand has the advantage that the manual transfer of the droplet with the nanoparticles to the measuring instrument necessary according to the prior art is dispensed with. Thereby a possible source of contamination is eliminated. In addition, the time and labour spent per measurement is reduced. In this manner, the device can be used for routine investigations. Furthermore, advantageously, the liquid channel is closed by the entry window on the side facing away from the sample holder. In this manner, it is possible that the particles of solid sample material produced by the laser beam can be essentially completely extracted via the discharge line of the ablation cell and conveyed to the analytical device. In this manner, in particular, a quantitative analysis of the solid sample material can be carried out in the analytical device.

For the purposes of this disclosure, information regarding location and orientation, such as "upper", "lower", "vertical", "horizontal", etc, refer to the intended operational status of the LASIL device.

Preferably, the carrier liquid may be water or a substance which is liquid at room temperature, in particular an organic solvent, for example acetonitrile or ethanol, or a mixture thereof. Preferably, dissolved additives are added to the carrier liquid such as metal salts, for example.

In accordance with a particularly preferred embodiment, the ablation cell on the one hand comprises a housing with the liquid channel and with the entry window and on the other hand comprises the sample holder with the solid sample material, wherein the housing is positioned onto the solid sample material in the operational condition. In this regard, the ablation cell in this embodiment comprises two units which can be connected together and separated from each other, wherein the one unit of the ablation cell is formed by the housing with the liquid channel and the entry window and the other unit is formed by the sample holder with the solid sample material. In order to prepare the analysis, the user places the housing onto the solid material, whereupon the liquid channel is formed between the upper side of the solid sample material and the underside of the housing. After the analysis, the housing can be removed again from the solid sample.

This embodiment is particularly advantageous for a number of reasons. On the one hand, the housing can be placed onto different, in particular flat samples, in particular by pressing, in order to form the liquid channel for ablation. This makes the analysis particularly flexible, because very different samples can be analysed. On the other hand, improved washout behaviour can be obtained. It is possible to minimise the region through which the liquid flows because not all of the sample has to be flushed with liquid, but rather only a section of the sample adjacent to the liquid channel.

In order to form the liquid channel on the underside of the housing when assembling the ablation cell, the housing preferably comprises a section of the supply line and/or a section of the discharge line, wherein the section of the supply line and/or the section of the discharge line are respectively connected to the liquid channel formed on the underside of the housing facing the solid sample material in the operational condition. Consequently, the section of the supply line (or correspondingly the section of the discharge line) respectively opens into an opening on the underside of the housing, so that in the condition in which the housing is positioned on the solid sample material, the liquid channel is formed between the upper side of the solid sample material and the underside of the housing.

In order to enable reliable analysis to be carried out, a releasable connection, in particular a clamp or screw connection, is provided in order to retain the housing on the solid sample material in the operational condition. In some embodiments, the releasable connection is designed in a manner such that in the operational condition, the housing is pressed against the upper side of the solid sample material.

In order to guarantee a seal of the liquid channel in the operational condition, in a preferred embodiment, the housing is provided with a sealing element on the underside facing the solid sample material which sealing element in the operational condition is in sealing contact with the solid sample material. When in the condition in which they are separated from each other, the housing is open to the bottom. When in the condition in which it is positioned on the solid sample, the liquid channel is formed between the underside of the housing, the sealing element and the upper side of the solid sample material.

In order to form the liquid channel in the operational condition, the height of the liquid channel preferably essentially corresponds to the thickness of the sealing element. The height or thickness is measured in this regard in the direction perpendicular to the direction of flow of the liquid in the liquid channel.

In an alternative embodiment, the sample holder for the solid sample comprises a respective section of the supply line and of the discharge line. In this embodiment, the sample holder comprises a chamber in which to lodge the solid sample. In the operational condition, the upper side of the chamber is closed by the entry window.

In a further preferred embodiment, the supply line comprises an end section which runs essentially perpendicular to the principal plane of the entry window and the discharge line comprises an end section which runs essentially perpendicular to the principal plane of the entry window, wherein the end section of the supply line is hydraulically connected to one end of the liquid channel in the ablation cell and the end section of the discharge line is hydraulically connected to the other end of the liquid channel in the ablation cell. This embodiment is particularly simple from a constructional viewpoint.

In accordance with a particularly preferred embodiment, the liquid channel comprises an essentially constant height of 10 µm to 1 mm, in particular of 50 µm to 200 µm between the sample holder and the entry window. This range for the height for the liquid channel, in particular ensures that the flow rate for transporting the particles away is sufficient, while the laser output impinging on the sample surface is only attenuated to a small extent.

In order to allow the solid sample material to be analysed continuously, in a particularly preferred embodiment, the supply line for the carrier liquid is connected to a pump device, which pump device is preferably configured in a manner such that an essentially constant volumetric flow of the carrier liquid is provided through the liquid channel of the ablation cell.

In order to enable a quantitative analysis of the solid sample material to be carried out, advantageously, a dosing device is provided with a dosing loop for introducing a defined volume of a standard liquid into the supply line. The standard liquid contains the same analyte as the solid sample material to be analysed. In an in-house measurement, the standard liquid can be introduced into the supply line with the aid of the dosing device, conveyed through the ablation cell and be analysed in the analytical device. In this manner, a calibration signal is obtained with which the measurement signal for the particles of solid sample material obtained by laser ablation can be calibrated. Advantageously, quantitative and stoichiometric investigations into the solid sample material can be carried out in this manner.

In accordance with a reliable, constructively simple embodiment, the dosing device preferably comprises a multi-way valve, in particular a 6-way valve. As is known per se in the prior art, the 6-way valve comprises two switch positions. In one switch position, a predetermined quantity of standard liquid is sent into the dosing loop. In the other switch position, the quantity of standard liquid held in the dosing loop is conveyed into the supply line for the ablation cell. An example of a 6-way valve of this type is described in U.S. Pat. No. 9,310,342. Alternatively, the dosing device may comprise an 8-way valve or a 10-way valve.

In order to enable a spatially resolved analysis of the solid sample material to be carried out, preferably, a device is provided for producing a relative movement between the ablation cell and the laser device in the longitudinal direction (x) and/or in the transverse direction (y) of the sample holder and/or in the height direction (z) essentially perpendicular to the longitudinal direction (x) and transverse direction (y). Depending on the embodiment, on the one hand a qualitative, preferably also quantitative analysis of the solid sample material may be carried out along the principal plane of the solid sample material, i.e. in the x-direction and/or in the y-direction. Advantageously, a spatial resolution of the measurement signal from the analytical device can be obtained in this manner. As an example, the composition of the solid sample material as a function of the x- and/or y-position in the principal plane of the solid sample material may be investigated.

In a preferred variation of the embodiment, the device comprises a stage for holding the ablation cell which stage is movable in the x- and/or y- and/or z-direction. In this variation, the laser device may be disposed in a stationary position.

For the elemental analysis of the solid sample, advantageously, the analytical device comprises an optical emission spectrometer or a mass spectrometer, in particular respectively with an excitation source and/or ionisation source. In particular, an inductively coupled plasma (ICP) module may be provided as the excitation and/or ionisation source.

The associated method is characterized by the following steps:

supplying the carrier liquid to a liquid channel of an ablation cell;

conveying the carrier liquid through the liquid channel of the ablation cell, wherein the particles of the solid sample material are ablated into the carrier liquid by irradiation with the laser beam; and discharging the suspension of particles of the solid sample material and of the carrier liquid from the liquid channel of the ablation cell.

The particles of the solid sample material may then in particular be analysed in respect of their elemental composition.

In a preferred embodiment, in the case of a spatially resolved analysis of the solid sample material, the following additional steps are carried out:

moving the solid sample material relative to the laser beam in the longitudinal direction (x) and/or in the transverse direction (y) of the solid sample material and/or in the height direction (z) of the solid sample material; and analysing the particles of solid sample material as a function of an x-position and/or a y-position and/or a z-position of the solid sample material relative to the laser beam.

Furthermore, the following steps are preferably carried out:

analysing a defined volume of a standard liquid containing an analyte of the solid sample material; and calibrating a first measurement signal obtained during analysis of the particles of the solid sample material by means of a second measurement signal obtained during analysis of the defined volume of the standard liquid.

Depending on the composition of the solid sample, a plurality of standard liquids can be analysed, each with a predetermined quantity of at least one analyte of the solid sample. Selection of the chemical elements and/or their contents contained in the standard solutions means that it is possible to tailor them to specific applications.

In this embodiment, the method may in particular comprise the following step:

determining a ratio between the quantity of a first analyte of the solid sample material and the quantity of a second analyte of the solid sample material.

A semiconductor, a glass or ceramic material may, for example, be provided as the solid sample material to be analysed. In order to analyse the defined volume of the standard liquid, a dosing loop is preferably used which is connected to a 6-way valve.

The invention will now be explained in more detail with reference to the accompanying exemplary embodiments; the invention is not, however, limited thereto.

BRIEF DESCRIPTION OF THE FIGURES

FIG. 3 shows a diagrammatic side view of the ablation cell according to FIG. 2;

FIG. 4 shows a detailed view of the section of the ablation cell in the box of FIG. 3, FIG. 6 shows an alternative embodiment of the LASIL device 1.

DETAILED DESCRIPTION

Figure 1:
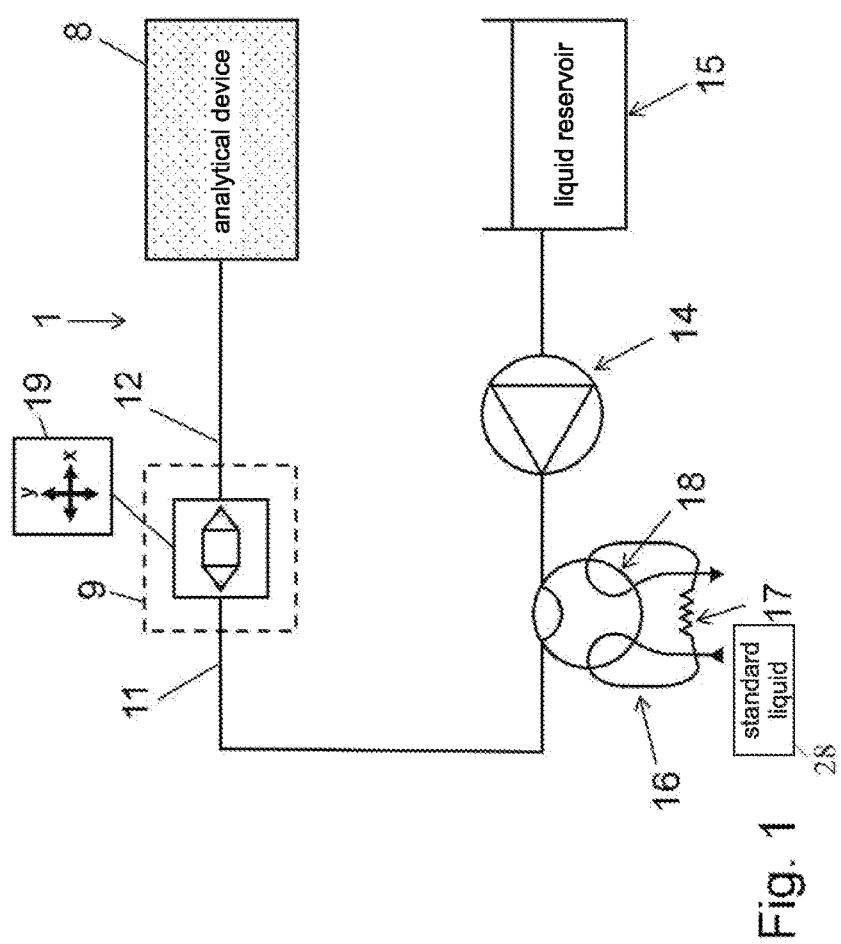
FIG. 1 shows a block diagram of a device in accordance with an embodiment of the invention for analysing a suspension of particles of a solid sample material and a carrier liquid the suspension being obtained by laser ablation.

FIG. 1 shows a device 1 for analysing a solid sample material 2 (see FIG. 4) by laser ablation of particles 3 of solid sample material 2 in a carrier liquid. The device 1 comprises a sample holder 5 (see FIG. 4) for arranging the solid sample material 2 covered with the carrier liquid. Furthermore, a laser device 6 is provided (shown only diagrammatically) which can emit a focussed and pulsed laser beam 7. The laser beam causes particles 3 to be detached from the surface of the solid sample material 2, whereupon a suspension of particles 3 of the solid sample material 2 and of the carrier liquid is produced. The LASIL device 1 additionally comprises an analytical device 8 for the analysis of the suspension of particles 3 of the solid sample material 2 and of the carrier liquid. The analytical device 8 may comprise an optical emission spectrometer with an ionisation source, in particular in the form of what is known as ICP-OES ("inductively coupled plasma optical emission spectrometry"). Alternatively, what is known as ICP-MS ("inductively coupled plasma mass spectrometry") may be used.

In the embodiment shown, the detachment of the particles 3 from the solid sample material 2 is carried out in an ablation or washout cell 9, in which the sample holder 5 is received to accommodate the solid sample material 2. The ablation cell 9 additionally comprises a liquid channel 10 which is closed in cross section, through which the carrier liquid is conveyed. Furthermore, a supply line 11 is provided to supply the carrier liquid to the liquid channel 10 of the ablation cell 9 (see arrow 20 in FIGS. 2, 4) and a discharge line 12 is provided for discharging the suspension of particles 3 of the solid sample material 2 and of the carrier liquid from the liquid channel 10 of the ablation cell 9 to the analytical device 8 (see arrow 21 in FIGS. 2, 4).

Figure 2:
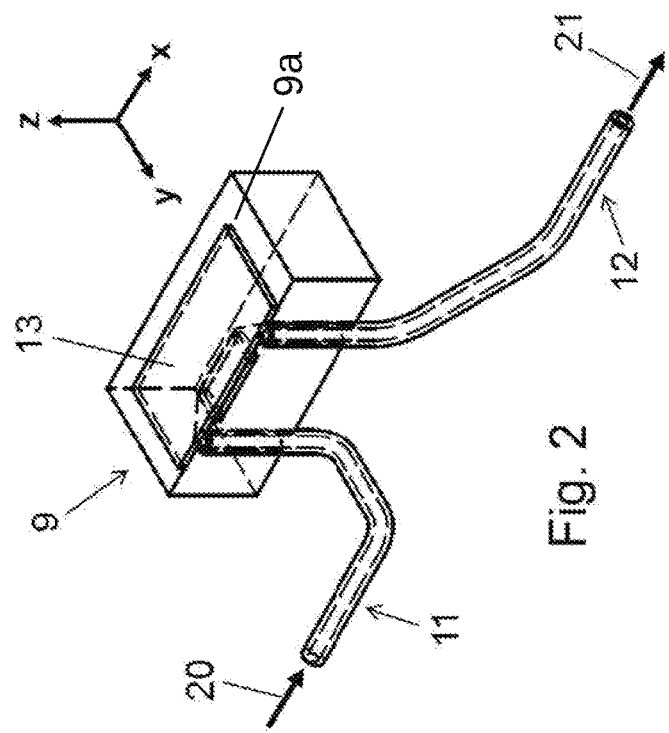
FIG. 2 shows an illustrative view of an ablation cell of the device according to FIG. 1, wherein the ablation cell is connected to a supply line and a discharge line for the carrier liquid.

As can be seen in FIGS. 2 to 4, the ablation cell 9 comprises an entry window 13 formed from a (solid) material which is transparent to the laser beam 7 of the laser device 6, for example $CaF_2$, fused quartz or borosilicate glass. In the embodiment of FIGS. 2 to 4, the entry window 13 is retained on the sample holder 5 of the ablation cell 9 via a releasable connection, in order to allow the solid sample material 2 below the entry window 13 to be changed. Furthermore, in this embodiment, the liquid channel 10 is formed within the sample holder 5.

Accordingly, the laser beam 7 passes through the entry window 13, penetrates into the carrier liquid and impinges upon the surface of the solid sample material 2, whereupon particles 3 of the solid sample material 2 are detached. The liquid channel 10 between the sample holder 5 and the entry window 13 comprises an essentially constant height of 10 µm to 1 mm, in particular of 50 µm to 200 µm (with respect to the direction of transport of the carrier liquid along the x axis). The "height" of the liquid channel in this case refers to the extent of the liquid channel in the z direction, i.e. in the direction essentially perpendicular to the principal plane of the sample holder which extends in the x axis and y axis.

The suspension formed, consisting of the carrier liquid and the (nano) particles 3 of the solid sample material 2, is conveyed to the analytical device 8, in which qualitative or quantitative investigations of the particles 3 are undertaken.

As can also be seen in FIG. 1, the supply line 11 for the carrier liquid is connected to a pump device 14 with which a carrier liquid is pumped from a liquid reservoir 15 into the supply line 11 for the ablation cell 9. The pump device 14 produces an essentially constant volumetric flow of the carrier liquid through the liquid channel 10 of the ablation cell 9, which is coordinated with the capacity of the analytical device 8.

As can also be seen in FIG. 1, in addition, a dosing device 16 with a dosing loop 17 is provided in order to introduce a defined volume of a standard liquid 28 into the supply line 11. In the embodiment shown, the dosing device 16 comprises a 6-way valve 18.

As can also be seen in FIG. 1, in the embodiment shown, a device 19 is provided to produce a relative movement between the ablation cell 9 and the laser device 6 in the longitudinal x-direction, in the transverse y-direction of the sample holder 5 perpendicular thereto and in the height z-direction perpendicular to the longitudinal x-direction and the transverse y-direction.

FIGS. 3 and 4 show the ablation cell 9. According to them, the carrier liquid coming from the supply line 11 is conveyed through the essentially horizontal liquid channel 10. Meanwhile, the surface of the solid sample material 2 is irradiated with the laser beam 7, whereupon particles 3 of the solid sample material 2 are taken up in the carrier liquid. The suspension formed is conveyed to the analytical device 8. As can be seen in FIG. 3, the supply line 11 comprises an end section 22 which runs essentially perpendicular to the principal plane of the entry window 13 and the discharge line 12 comprises an end section 23 which runs essentially perpendicular to the principal plane of the entry window 13. The end section 22 of the supply line 11 is hydraulically connected to one end of the liquid channel 10 in the ablation cell 9. Correspondingly, the end section 23 of the discharge line 12 is hydraulically connected to the other end of the liquid channel 10 in the ablation cell 9.

A method for analysing a solid sample material 2 by laser ablation of particles 3 of the solid sample material 2 into a carrier liquid may be carried out using the device 1 described above; the method comprises at least the following steps:

providing the solid sample material 2 and a layer of the carrier liquid which covers the solid sample material 2;

irradiating the solid sample material 2 with a laser beam 7 in a manner such that a suspension of particles 3 of the solid sample material 2 and of the carrier liquid is produced;

analysing the suspension of particles 3 of solid sample material 2 and the carrier liquid;

supplying the carrier liquid to a liquid channel 10 of a through-flow ablation cell 9;

conveying the carrier liquid through a liquid channel 10 of an ablation cell 9, wherein the particles 3 of the solid sample material 2 are ablated into the carrier liquid by irradiation with the laser beam 7; and discharging the suspension of particles 3 of the solid sample material 2 and of the carrier liquid from the liquid channel 10 of the ablation cell 9.

In order to obtain a spatially resolved analysis of the solid sample material 2, in addition, the following steps may be carried out:

moving the solid sample material 2 relative to the laser beam in the longitudinal x-direction and/or in the transverse y-direction of the solid sample material 2 and/or in the height z-direction of the solid sample material 2; and analysing the suspension of particles 3 of solid sample material 2 and of the carrier liquid as a function of an x-position and/or a y-position and/or a z-position of the solid sample material 2 relative to the laser beam 7.

Accordingly, an analytical method is provided which combines the advantages of solid and liquid analytical systems. The sample in this case is located in a specially prepared ablation or washout cell 9 which is flushed with a stream of carrier liquid, which is preferably flowing essentially continuously, in particular water or an advantageously diluted acid. The ablation cell 9 is configured with an entry window 13 which is transparent to the wavelength of the laser device 6. If the laser beam 7 is directed through the entry window 13 onto the sample surface, very fine particles 3 are produced which form a nanosol in the stream of liquid. This suspension is transported out of the ablation cell 9 and to an analytical device 8 in the form of an ICP-OES or ICP-MS instrument in order to display a transient analyte signal. The measurement signals may be quantified with the aid of aqueous standards (standard liquids). The aqueous standards may be introduced into the supply line 11 for the carrier liquid via a dosing device 16, in particular in the form of a flow injection system with a dosing loop 17. This procedure can be automated with the device 1, whereupon an analysis of the sample is possible without manual intervention. In this manner, materials can easily be analysed, particularly when they are difficult to dissolve, such as ceramics. The method provides benefits also for other samples. The single fundamental prerequisite is that these samples must be insoluble in the carrier liquid employed.

EXAMPLE

The method was used to analyse the stoichiometry of a $SrTiO_3$ layer produced by laser deposition (PLD—"pulsed laser deposition"). The $SrTiO_3$ layer was applied to a substrate of small yttrium-stabilised zirconium oxide plates. The thickness of the layer was approximately 500 nm.

Figure 5:
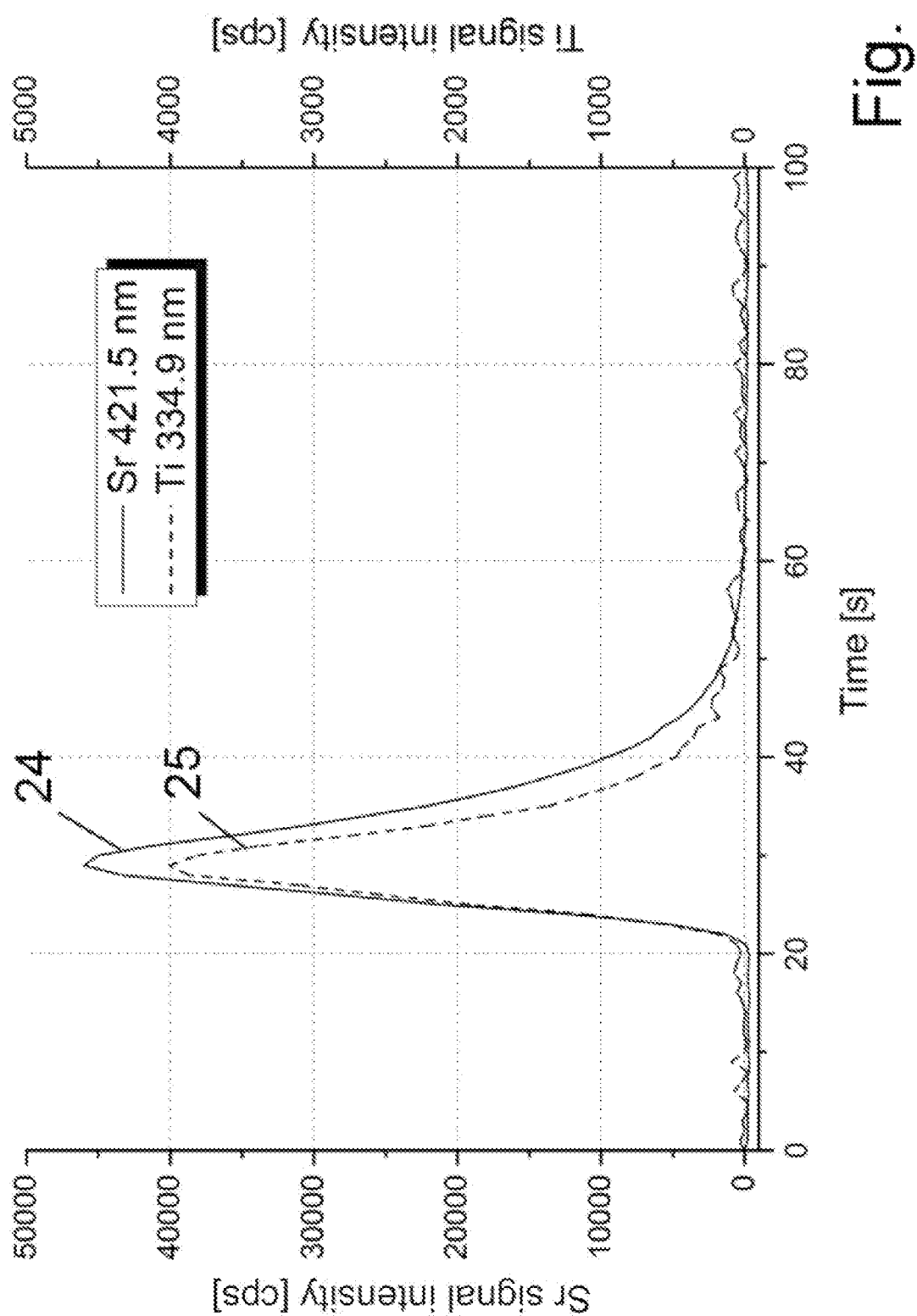
FIG. 5 shows a graph of the signal-time plot of respectively a Sr as well as a Ti emission line in an analytical device of the device according to FIG. 1.

FIG. 5 shows the signal-time plot of a Sr emission line 24 as well as of a Ti emission line 25 respectively during a spot ablation of the sample with a laser beam 7 with a diameter of 200 μm and a laser output of 1.83 mJ. Ten laser pulses were fired onto the sample. In FIG. 5, the sufficiency of the signal intensity for both of the analytes of interest as well as good washout behaviour of the ablation cell 9 can be seen. By means of calibration using the dosing device 16, it could be established that the total of the ablated and detected quantity of sample material 2 was approximately 140 ng.

The relative composition of the sample material 2 could be determined by means of the standard liquids introduced via the dosing device 16. By constructing a mean value from six individual measurements, a ratio of 1.000±0.017 (Sr) to 0.988±0.017 (Ti) was determined. The values obtained were not significantly different from a ratio of 1:1. From this, it could be concluded that a stoichiometric layer was present. This example demonstrates an application of the online LASIL method, with which a substantial amount of time can be saved compared with the sample preparation which is necessary for conventional liquid analytical procedures. The $SrTiO_3$ layer could only be dissolved by using an intensive fusion disintegration procedure. In addition, a liquid measurement would not outperform the precision of the measurements demonstrated here.

FIG. 6 shows an alternative embodiment of the LASIL device 1, wherein only the differences between this and the embodiment of FIGS. 1 to 5 will be considered below.

In the embodiment of the LASIL device 1 of FIGS. 1 to 5, the solid sample material 2 is placed in a chamber 5a (see FIG. 4) of the sample holder 5, which also contains the liquid channel 10. In particular, the chamber 5a may be configured as a basin-shaped depression on the upper side of the sample holder 5. In order to prepare for the measurement, the solid sample material 2 is placed in the chamber 5a with the entry window 13 removed before the liquid channel 10 is closed with the entry window 13.

According to FIG. 6, the ablation cell 9 comprises on one side a housing 9a with the liquid channel 10 and the entry window 13, and on the other side the sample holder 5 for the solid sample material 2. The housing 9 with the liquid channel 10 and the entry window 13, and the sample holder 5 with the solid sample material 2 are separate from each other. In this embodiment, the sample holder 5 does not have a liquid channel 13. As an example, the sample holder 5 may thus be formed by an underlay which in particular is shaped like a plate. In this embodiment, the housing 9a thus forms the actual ablation cell 9, which in the intended operational condition, i.e. during ablation, is positioned on the solid sample material 2. To this end, the housing 9a is provided with a sealing element 26 on the underside facing the solid sample material 2; in the operational condition, the sealing element is in sealing contact with the solid sample material 2. Preferably, the sealing element 26 is formed from an elastomer, in particular polymethylmethacrylate (PMMA) or silicone. Furthermore, a releasable connection 30 (as shown by the arrows of FIG. 6), in particular a clamp or screw connection, may be provided in order to firmly retain the housing 9 on the solid sample material 2 when in the assembled operational condition. The solid sample material 2 preferably has a flat shape, in particular with an even upper side.

In this embodiment, in contrast to FIGS. 1 to 5, a greater flexibility during analysis of various samples is obtained because the sample does not have to fit into the chamber 5a of the sample holder 5. The principle of the analysis is unchanged in this regard.

As can be seen in FIG. 6, the housing 9a has a section 11a of the supply line 11 which is upstream of the liquid channel 10 in the direction of flow and a section 12a of the discharge line 12 which is downstream of the liquid channel 10 in the direction of flow. The supply line 11 and the discharge line 12 respectively open into the liquid channel 10, which in the embodiment shown is formed on the underside of the housing 9a. In the embodiment shown, the liquid channel 10 is delimited by the underside of the housing 9a, the sealing element 26 and the surface of the solid sample material 2. As described above, the liquid channel 10 is flushed with a stream of liquid from the supply line 11. In this regard, a film of liquid 3a is produced on the surface of the sample. In the embodiment shown, the height of the film of liquid essentially corresponds to the thickness of the sealing element 26, which in the operational condition is located between the housing 9a and the sample surface. Preferably, the sealing element has a thickness of 10 μm to 1 mm, in particular from 50 μm to 200 μm. Preferably, the sealing element 26 essentially extends over the entire underside of the housing 9a, however with a recess corresponding to the liquid channel 10. Above the liquid channel 10 is the optical entry window 13, for example formed from CaF2 or fused quartz, which is highly transparent at the wavelength of the laser employed. When the laser beam 7 impinges upon the sample surface, nanoparticles of the sample material are formed (in the same way as indicated above in connection with FIGS.

1 to 5), which are transported away by the liquid stream in the direction of the outlet 12.

The housing 9a is preferably produced from a synthetic material, so that in particular, no metallic contaminants can be released into the liquid to be analysed. Preferred synthetic materials are chemically inert; examples here are polyoxymethylene (POM) or polytetrafluoroethylene (PTFE).

According to FIG. 6, the housing 9a comprises a recess 27, sections of which in the variation shown converge downwardly in the manner of a funnel. The entry window 13 is disposed at the underside of the recess and closes the liquid channel 10 from the top.

The embodiment of FIG. 6 is characterized by being particularly flexible and user-friendly. Advantageously, a particularly good washout behaviour can be obtained. It is possible to minimise the effective region through which liquid flows, because the entire sample no longer has to be flushed with the liquid.

The invention claimed is:

1. A device configured for analysing a solid sample material by means of laser ablation of particles of the solid sample material in a carrier liquid, comprising:
    a sample holder configured for positioning the solid sample material covered with the carrier liquid;
    a laser device configured for irradiating the solid sample material with a laser beam in a manner such that a suspension of particles of the solid sample material and of the carrier liquid is produced;
    an analytical device configured for analysing the particles of the solid sample material;
    wherein the sample holder is in an ablation cell comprising a liquid channel for the carrier liquid and an entry window produced from a material that is transparent to the laser beam of the laser device, and wherein the ablation cell comprises the sample holder and a housing comprising the liquid channel and the entry window;
    a supply line to supply the carrier liquid to the liquid channel of the ablation cell;
    a discharge line to discharge the suspension of particles of the solid sample material and of the carrier liquid from the liquid channel of the ablation cell to the analytical device; and
    a dosing device configured for introducing a defined volume of a standard liquid into the supply line;
    wherein the housing contains a section of the supply line and/or a section of the discharge line, wherein the section of the supply line and/or the section of the discharge line are respectively connected to the liquid channel formed on an underside of the housing wherein the underside faces the solid sample material in an operational condition.

2. The device as claimed in claim 1, wherein the housing is connected to the solid sample material via a releasable connection.

3. The device as claimed in claim 1, wherein the housing comprises a sealing element on an underside of the housing facing the solid sample material.

4. The device as claimed in claim 3, wherein a height of the liquid channel corresponds to a thickness of the sealing element.

5. The device as claimed in claim 1, wherein the liquid channel has a constant height between the sample holder and the entry window.

6. The device as claimed in claim 1, wherein the supply line configured for the carrier liquid is connected to a pump device, wherein the pump device maintains constant volumetric flow of the carrier liquid through the liquid channel of the ablation cell.

7. The device as claimed in claim 1, wherein the dosing device has a dosing loop configured for introducing the defined volume of the standard liquid into the supply line.

8. The device as claimed in claim 7, wherein the dosing device comprises a multi-way valve.

9. The device as claimed in claim 1, further comprising a mechanism to produce a relative movement between the ablation cell and the laser device in the longitudinal direction (x) and/or in the transverse direction (y) of the sample holder and/or in the height direction (z) essentially perpendicular to the longitudinal direction (x) and transverse direction (y).

10. The device as claimed in claim 1, wherein the analytical device comprises an optical emission spectrometer or a mass spectrometer.

11. A method for analysing a solid sample material by means of laser ablation of particles of a solid sample material in a carrier liquid, comprising:
    providing the solid sample material and a layer of the carrier liquid which covers the solid sample material;
    irradiating the solid sample material with a laser beam in a manner such that a suspension of particles of the solid sample material and of the carrier liquid is produced;
    analysing the particles of the solid sample material;
    wherein the solid sample is in a sample holder in an ablation cell comprising an entry window produced from a material that is transparent to the laser beams;
    supplying the carrier liquid via a supply line to a liquid channel of the ablation cell;
    conveying the carrier liquid through the liquid channel of the ablation cell, wherein the particles of the solid sample material are ablated into the carrier liquid by irradiation with the laser beam;
    discharging the suspension of particles of the solid sample material and of the carrier liquid via a discharge line from the liquid channel of the ablation cell; and
    introducing a defined volume of a standard liquid into the supply line with a dosing device;
    wherein the ablation cell comprises the sample holder and a housing comprising a liquid channel and the entry window, wherein the housing contains a section of the supply line and/or a section of the discharge line, wherein the section of the supply line and/or the section of the discharge line are respectively connected to the liquid channel formed on an underside of the housing wherein the underside faces the solid sample material.

12. The method as claimed in claim 11, comprising the following steps:
    moving the solid sample material relative to the laser beam in the longitudinal direction (x) and/or in the transverse direction (y) of the solid sample material and/or in the height direction (z) of the solid sample material; and
    analysing the particles of solid sample material as a function of an x-position and/or a y-position and/or a z-position of the solid sample material relative to the laser beam.

* * * * *